Nov. 10, 1936.   C. A. BROWN ET AL   2,060,658
METHOD OF AND APPARATUS FOR SHAPING GLASS
Original Filed Sept. 29, 1933   3 Sheets-Sheet 1
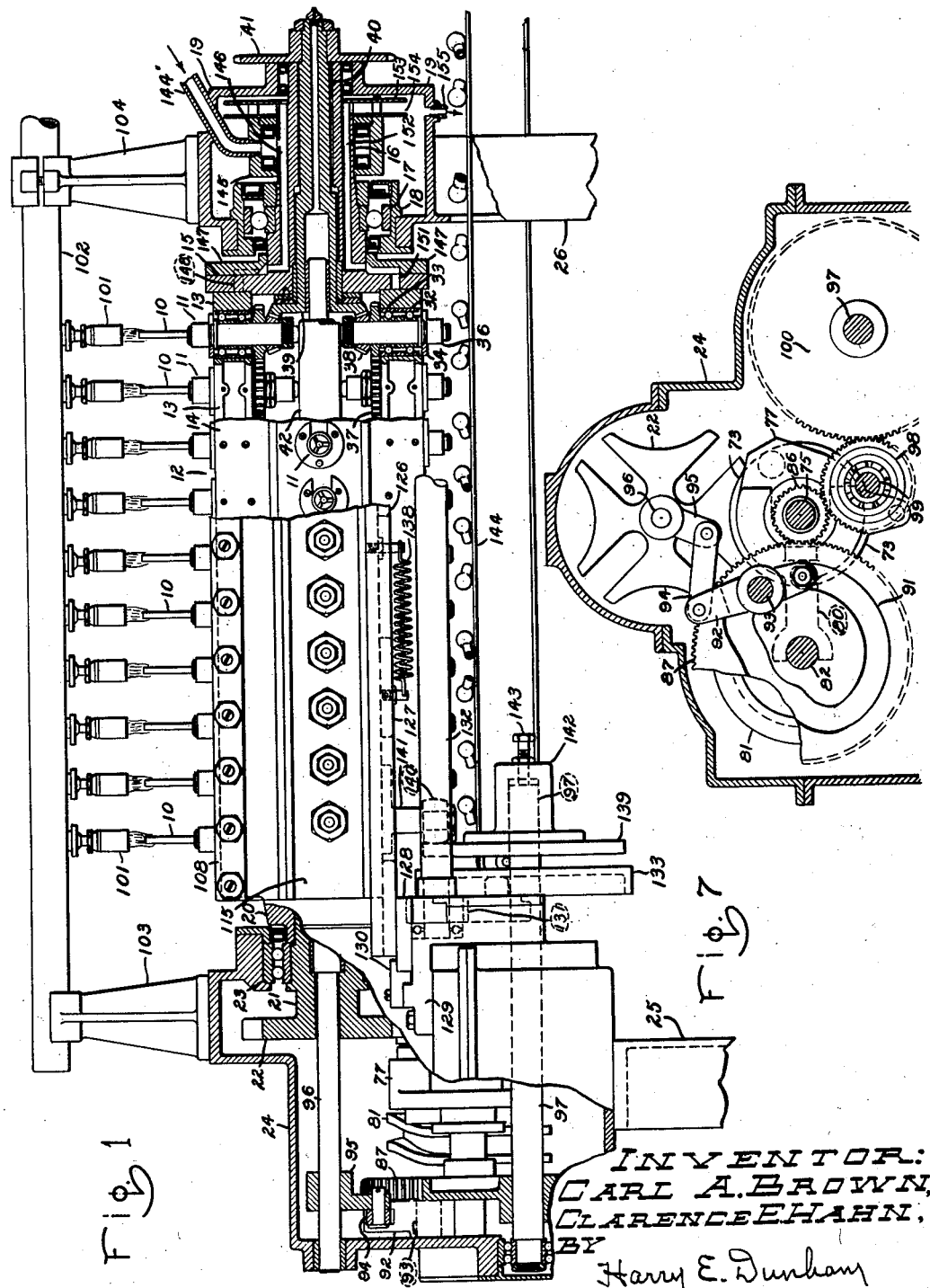
INVENTOR:
CARL A. BROWN,
CLARENCE E. HAHN,
BY Harry E. Dunham
THEIR ATTORNEY.

Nov. 10, 1936.                C. A. BROWN ET AL                2,060,658
                    METHOD OF AND APPARATUS FOR SHAPING GLASS
                    Original Filed Sept. 29, 1933    3 Sheets-Sheet 2
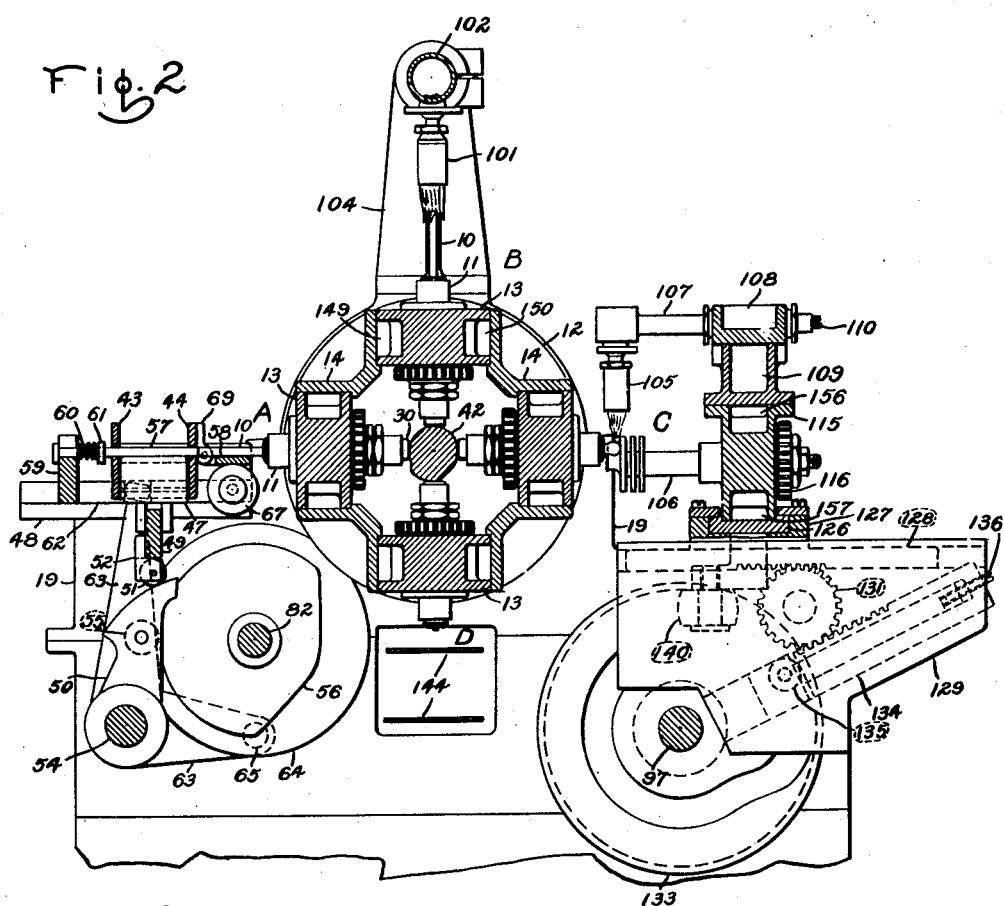
INVENTOR:
CARL A. BROWN,
CLARENCE E. HAHN,
BY
Harry E. Dunham
THEIR ATTORNEY.

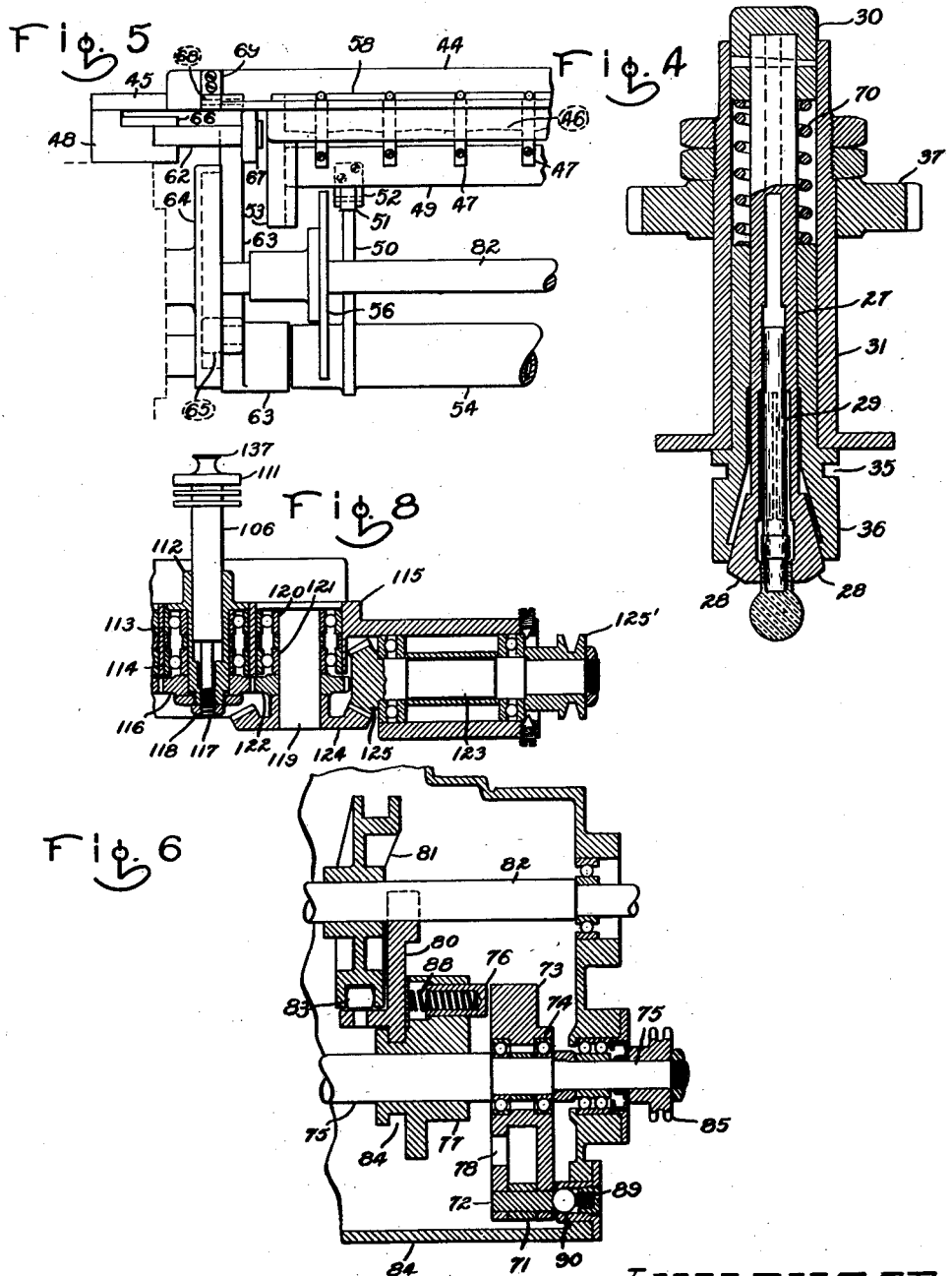

Patented Nov. 10, 1936

2,060,658

UNITED STATES PATENT OFFICE 2,060,658

METHOD OF AND APPARATUS FOR SHAPING GLASS

Carl A. Brown, Chardon, and Clarence E. Hahn, Cleveland Heights, Ohio, assignors to General Electric Company, a corporation of New York Application September 29, 1933, Serial No. 691,480
Renewed April 23, 1936

11 Claims. (Cl. 49—7)

Our invention relates to methods and apparatus for re-shaping glass and more particularly to methods and machines for making lamp bulbs and the like. Still more particularly our invention relates to the manufacture of bulbs comprising a solid spherical lens-end portion and a tubular portion extending therefrom. Incandescent lamps made from this type of bulb have the tubular portion closed off by another body of glass sealed thereto and have the filament located within said tubular portion. One object of our invention is to provide a method of manufacture which is simple, efficient and suitable for machine use. Another object of our invention is to provide a method of manufacture which shapes both the inside and the outside of the bulb as desired and produces a product free from bubbles and other defects. Still another object of our invention is to provide a machine for practicing this method of manufacture and still another object is to provide a completely automatic machine therefor. Other features and advantages of our invention will be apparent from the detailed description which follows and from the accompanying drawings.

In the drawings Fig. 1 is a side view partially in section of the machine of our invention; Fig. 2 is a vertical section therethrough; Fig. 3 shows various steps of operation; Fig. 4 is a section through a machine head; Fig. 5 is a side view of a portion of the tube feeding mechanism; Fig. 6 is a horizontal section through the turret indexing mechanism; Fig. 7 is a sectional view of the drive mechanism in the housing at the left end of the machine; and Fig. 8 is a horizontal section through a portion of the forming mechanism.

Briefly, our method of manufacture as shown in Figs. 1, 2, and 3 consists in a series of operations performed at four positions about a horizontally mounted turret. The turret carries a series of ten heads at each of the four positions, 90° apart, and as intermittently indexed carries a glass tube which is fed into the heads at one position through several operations which re-shape it into the bulb desired. Each head of the series at one position about the turret passes through a like operation. The order of operation as shown in Figs. 2 and 3 is as follows: first at position A, one end of a length of glass tubing 10 is fed into the head 11; second at position B, fires are directed against the protruding end of said tubing until it is partially melted down; third, at position C, while being heated by another set of fires the molten end of the tube is upset by having a flat surface pressed thereagainst; fourth, also at position C, a forming roll is pressed against the side of the molten mass forming it into a sphere; and fifth, at position D, the newly formed bulb is partially cooled while suspended sphere down and is allowed to drop from the head before it is again indexed into position A. The machine is driven from external sources of power through a belt and chains.

More specifically, the machine comprises a horizontally mounted turret 12 composed of four rectangular blocks 13 mounted at 90° intervals between angular support members 14 and in each of which a series of ten heads 11 is mounted. The right end of the turret is attached to the flanged portion 15 of spindle 16 which turns in ball bearing 17 in bearing retainer 18 of housing 19. The left end of the turret is attached to collar 20 on the shank portion 21 of Geneva gear 22 which turns on ball bearing 23 in housing 24. The housings at either end of the machine are supported on legs 25 and 26. Each of the turret heads 11 comprises, as shown in Figs. 1 and 4, a hollow spindle 27 having jaws 28 cut from the outer end thereof, a pin 29 frictionally held in the core thereof and a cap 30 pinned to the inner end. The whole is mounted in sleeve 31 in ball bearings 32 and 33 in block 13 and is retained therein by collar 34 which engages groove 35 in cap 36. During the operation of the machine the turret heads are always in rotation as sleeves 31 are keyed to gears 37 which mesh with the adjacent gears of the series of heads. Sleeves 31 of the extreme right head of each series are provided with bevel gears 38 by which that series is driven from bevel gear 39 of shaft 40 which in turn is driven from some external source through a chain on sprocket 41.

The cycle of operation begins at position A and consists in feeding a short length of glass tubing end first into each of one series of heads. As the operation begins the jaws 28 are separated to allow insertion of an end of the tube therebetween by cam 42 which engages cap 30 and pushes jaws 28 outward from cap 36 allowing the springiness thereof to pull them apart. The glass tubes 10 are arranged parallel in the hopper shown in Figs. 2 and 5 which comprises opposite sides 43 and 44 mounted on plates 45 at each end of the machine and the bottom of blocks 46 and slides 47 therebetween. Plates 45 are mounted on brackets 48 on each of the end housings. The bottom blocks 46 of the hopper taper off in either direction causing the tubes to roll down onto the edges of slides 47 which are then in the lower position and are raised to the position shown. Slides 47 are attached to bar 49 which is moved vertically by cam segments 50 at each end, of which only one is shown, through rollers 51 on arms 52. The ends of bar 49 are guided by grooves in brackets 53. The cam segments are attached to tube 54 and are rotated by roller 55 on the left segment which engages cam 56. With slides 47 in the raised position the tube thereon is fed by a rod 57 entering through a hole in hopper side 43 which pushes the tube end first through a hole in hopper side 44 along guide plate 58 and partially into the head. This movement is produced by bar 59 which engages said rods through springs 60 and collars 61 and is mounted at each end on slides 62 in brackets 48. Each of the slides 62 is operated from a lever 63 mounted slidably on a smaller section of tube 54 which engages a track (not shown) in cam 64 through roller 65. The slides are reciprocated in ways in brackets 48 in which they are held by plates 66. During the greater portion of the feeding movement of glass tube 10 guide plate 58 is held up in the position shown by rollers 67 on slides 62 but at other intervals said plate hangs free from pins 68 in brackets 69 of hopper side 44. This operation causes the removal of whatever broken glass which collects due to improper feed, faulty tubing, etc. With a portion of the tubes located within the turret head the jaws are closed by rotation of cam 42. The low part of the cam comes below cap 30 which permits spring 70 (Fig. 4) to move spindle 27 inward causing it to strike cap 36 and to engage the tube as shown.

The turret is now rotated, indexing the heads from position A to position B and placing the tubes 10 in position to be worked. The turret is rotated by Geneva gear 22 which, as shown in Figs. 1, 6 and 7, is engaged by roller 71 on pin 72 of Geneva pinion 73. The pinion turns on ball bearings 74 on shaft 75 and during the period of operation is engaged by pin 76 of wheel 77 which is then inserted in hole 78 of the pinion. This mechanism is introduced to reduce the time of motion during the index and disengages during the rest period. When engaged the position of wheel 77 which is keyed to shaft 75 is farther to the right than shown and when disengaged said wheel is moved to the left by arm 80 drawing pin 76 out of engagement. Arm 80 engages the ways of cam 81 on shaft 82 through roller 83 and has U-shaped ends which ride on shaft 82 and in groove 84 of wheel 77. Shaft 75 is driven from an external source through a chain on sprocket 85 and shaft 82 is driven at reduced speed from shaft 75 through gears 86 and 87. Spring 88 permits pin 76 to move back in wheel 77 when it is against said wheel and not located over the hole 78. Spring 89 forces ball 90 into the hollow of pin 72 holding pinion 73 in the position shown during the rest period. Shaft 75 is continually in motion and drives indirectly all portions of the machine operating with relation to the turret index action. One such apparatus is the tube feeding mechanism previously described, which is driven from cams 56 and 64 on the exterior end of shaft 82 and another is the jaw opening cam 42 which is driven from cam ways 91 in gear 87 on shaft 82. A roller on lever 92 engages ways 91 and turns said lever about pin 93 in the housing operating cam 42 through link 94 and lever 95 on the extension 96 thereof. The remaining mechanism driven from shaft 75 operates off cams on shaft 97 which is driven thereby through gear 86, gear 98 on stud 99 protruding from the housing and gear 100 attached to shaft 97.

At position B fires play directly down on the end of the tubes causing them to partially melt down as shown in Fig. 3. On coming into position B the tube end comes under fires from burners 101 which are mounted on manifold 102 through which a mixture of air and gas is carried thereto. The manifold is supported on brackets 103 and 104 on housings 24 and 19 respectively and has the gas and air lines (not shown) connected thereto through valves for controlling the mixture. As the tube 10 is melted down the air in the center opening thereof which may have been trapped as the end closes over escapes by pin 29. From position B the heads are indexed to position C.

At position C the partially melted tube end comes in operative relation to the fires of burners 105 and is then upset and formed by spindle 106 as shown at C and C' of Fig. 3. The burners 105 are mounted on the end of arms 107 extending from manifold 108 and receive a properly proportioned mixture of gas and air from passage 109 therein through a passage not shown in arms 107. Screws 110 control the volume of the gas mixture admitted to the burner by closing off passages connecting passage 109 and the passage in arms 107. Flexible gas and air connections to the manifold are not shown. In upsetting the tube 10, the spindle 106 moves toward the turret during which time the tube end strikes flange 111 and is upset by it. The spindle 106 (Fig. 8) is mounted in sleeve 112 which rides in ball bearings 113 and 114 in block 115 and is rotated continually by gear 116 on said sleeve. The spindle rotates in the opposite direction to the turret head and preferably about the same speed. The spindle can be adjusted in or out by turning shank 117 in sleeve 112 and is locked in place by nut 118. Gear 116 of each of the ten spindles meshes with corresponding gears of adjacent spindles and the whole are operated by a dummy spindle 119 which turns on ball bearings 120 and 121 and engages gear 116 through gear 122 thereon. Spindle 119 is driven by shaft 123 through bevel gears 124 and 125 which in turn is rotated through pulley 125' from some external source. As the upsetting occurs the assembly comprising block 115, slide 126, plate 127 and the slides 128 at either end thereof is moved inward. The slides move in ways in brackets 129 extending from the end housings of the machine in which they are held by plates 130 and are caused to move by gears 131 on either end of shaft 132 which mesh with teeth cut from said slides. Cam 133 on shaft 97 operates this assembly through slide 134 which engages ways therein through roller 135 and has teeth cut in the upper edge thereof which mesh with gear 131 at the left end of the device. Screw 136 allows adjustment of the forward part of said slide.

The second operation of spindle 106 is to move to the left bringing the forming roll 137 against the plastic glass mass as shown at C' of Fig. 3. The object of this operation is to form the mass into a sphere. The motion occurs as slide 126 on which block 115 is mounted is slid on plate 127 by spring 138 due to the lesser thickness of cam 139 coming below roller 140. The spring extends between a post in slide 126 and one in plate 127 and the roller 140 is attached to bracket 141 attached to plate 127. Should adjustment of the position of the slide be required hub 142 by which cam 139 is attached to shaft 97 may be moved thereon by turning screw 143. On completion of the forming the spindle returns to a position clear of the heads whereupon the turret is indexed, bringing the heads into position D.

At position D the tubes or bulbs, as they may now be called, are allowed to cool while still held in the turret heads for most of the period after which they are released and drop onto belt 144 which carries them away. The release occurs as the thicker portion of the cam 42 is moved out from under the heads at position A and under the heads at D.

Both the turret and the forming spindle supporting means are water cooled. The former, the turret, has water passing through pipe 144' (Fig. 1) into the interior of collar 145 from which it passes through an opening into passage 146 of spindle 16. Ring 147 attached to the flange 15 of said spindle is drilled to permit the water to circulate to passage 148 and hence along passage 149 (Fig. 2) at one side of block 13 to the end and back the other side of said block through passage 150. The water returns through a separate but similar route by passage 151 to passage 152 and empties into the space between plates 153 and 154 hence to housing 19 and out pipe 155. The forming spindle supporting block 115 is cooled by water entering passage 156 therein through a pipe not shown in which it circulates from the right end to the left, then down into passage 157 in the lower half and back out a passage in slide 126 not shown.

What we claim as new and desire to secure by Letters Patent of the United States, is:—

1. The method of manufacturing lens-end bulbs for electric lamps characterized by the heating of the end of a tubular glass body having thin walls to render it workable, the upsetting of said end into a compact solid mass, and the shaping of said mass into a solid lens portion of definite size and shape by contacting it with the periphery of a roll while said mass is being rotated so as to present all parts thereof to said roll.

2. The method of manufacturing lens-end bulbs for electric lamps characterized by the heating of the end of a glass body having thin walls to render it workable, the upsetting of said end into a compact solid mass while located axially in a substantially horizontal position, and the shaping of said mass into a solid lens portion of definite size and shape by contacting it with the periphery of a roll located to one side thereof while both the glass mass and roll are being rotated so the surface of each at the point of contact is moving at substantially the same speed and in the same direction.

3. The method of manufacturing a plurality of lens-end bulbs for electric lamps simultaneously characterized in each instance by the heating of one end of a glass body having thin walls to render it workable, the upsetting of said end into a compact mass, and the shaping of said mass into a solid lens portion of definite size and shape by contact with the periphery of a roll while said mass is being rotated so as to present all parts thereof to said roll.

4. The method of manufacturing a plurality of lens-end bulbs for electric lamps simultaneously characterized in each instance by the heating of one end of a glass body having thin walls to render it workable, the upsetting of said end into a compact mass, and the shaping of said mass into a solid lens portion of definite size and shape by contact with the periphery of a roll located to one side thereof while both the glass mass and roll are being rotated so the surface of each at the point of contact is moving at substantially the same speed and in the same direction.

5. A machine for manufacturing lens-end bulbs for electric lamps from tubular glass bodies comprising a turret mounted on a horizontal axis, means for holding said bodies at positions thereabout, means for indexing said turret intermittently to interchange the positions of said holding means, a burner positioned above said turret and directed onto an end of said body protruding from the holding means, another burner located at a subsequent position about said turret and movable with respect thereto, a body having a substantially plane surface mounted movably at said position, a roll also mounted movably at this position and means for rotating the holding means and glass body, for moving the surface of said body against the end of the body to upset it into a compact solid mass, for moving said roller against said glass body to shape it into a solid lens portion of definite size and shape and for keeping the burners directed thereagainst.

6. A machine for reshaping one end of vitreous tubing comprising a turret mounted on a horizontal axis, a plurality of heads mounted on said turret for holding said tubing, means for causing the rotation of said heads, means for indexing said turret intermittently to interchange the positions of said heads, a hopper at one position thereabout, means for feeding tubing from said hopper to said heads, at another position about said turret a burner directed onto an end of the tube therein to render it workable, at a subsequent position another burner movably mounted with respect to said tubing, a spindle having an outwardly extending flange thereon and a roll mounted on the axis thereof, means for moving said spindle longitudinally to carry said flange against the end of said tubing to upset it, means for moving said spindle transversely to carry the periphery of said roll against the side of the upset portion of said tube to shape it and means for keeping said fires directed against said tube during said operation.

7. In a machine for reshaping an end of vitreous tubing, a head for holding one end of said tubing comprising a plurality of jaws, a pin disposed within said jaws, means for heating and shaping the exterior portion of the protruding end of said tubing and for causing that portion to be melted down onto the head of said pin so as to shape the crown of the tubular portion.

8. The method of manufacturing lens-end bulbs for electric lamps characterized by the heating of the upper end of a vertically disposed thin-walled tubular glass body to render it workable, the transferring of said glass body to an axially horizontal position, the upsetting of said end into a compact solid mass, and the shaping of said mass into a lens portion of definite size and shape by contacting it with the periphery of a roll while said mass is being rotated so as to present all parts thereof to said roll.

9. A machine for manufacturing lens-end bulbs for electric lamps from glass tubing comprising a turret rotatably mounted on a horizontal axis, a plurality of holders for lengths of said glass tubing mounted on said turret, means for causing the rotation of said holders about their axes, means for indexing said turret intermittently, a hopper at the horizontal position of a holder, means for feeding tubing from said hopper to a holder at said horizontal position, a burner at the upper vertical position of a holder directed onto the upper end of the tube therein to render it workable, a body having a substantially plane surface mounted movably at the horizontal position of a holder opposite said hopper, a roll also mounted movably at this position, means for moving the surface of said body against the end of the tube to upset it and for moving said roll against said end of said tube to shape it, and means for automatically opening said holders at the lower vertical position to discharge the shaped glass tubes.

10. A machine for manufacturing lens-end bulbs for electric lamps from glass tubing comprising a turret rotatably mounted on a horizontal axis, a plurality of longitudinal rows of holders for lengths of said glass tubing mounted on said turret, means for causing the rotation of said holders about their axes, means for indexing said turret intermittently, a hopper at the horizontal position of a row of said holders, means for feeding tubing from said hopper to a row of said holders at said horizontal position, a plurality of burners at the upper vertical position of a row of said holders directed onto the upper end of the tubes therein to render them workable, a horizontal row of bodies each having a substantially plane surface mounted movably at the horizontal position of a row of said holders opposite said hopper, a plurality of rolls also mounted movably at this position, means for moving the surface of each of said bodies against the ends of the tubes to upset them and for moving said rolls against said ends of said tubes to shape them, and means for automatically opening said holders at the lower vertical position to discharge the shaped glass tubes.

11. In a device of the class described for manufacturing lens-end bulbs for electric lamps, a holder for a length of glass tubing, means for rotating said holder and tubing, a burner directed against the end of said tubing to render it workable, a spindle having an outwardly extending flange thereon and a roll mounted on the axis thereof, means for moving said spindle longitudinally to carry said flange against the end of said tubing to upset it, and means for moving said spindle transversely to carry the periphery of said roll against the side of the upset portion of said tube to shape it.

CARL A. BROWN.
CLARENCE E. HAHN.